(12) United States Patent
Bishop

(10) Patent No.: US 12,097,951 B2
(45) Date of Patent: Sep. 24, 2024

(54) LANDING GEAR ASSEMBLY

(71) Applicant: AIRBUS OPERATIONS LIMITED, Bristol (GB)

(72) Inventor: Benjamin Bishop, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/320,346

(22) Filed: May 19, 2023

(65) Prior Publication Data
US 2023/0373614 A1 Nov. 23, 2023

(30) Foreign Application Priority Data
May 20, 2022 (GB) ...................................... 2207423

(51) Int. Cl.
*B64C 25/26* (2006.01)
*B64C 25/58* (2006.01)

(52) U.S. Cl.
CPC .............. *B64C 25/26* (2013.01); *B64C 25/58* (2013.01)

(58) Field of Classification Search
CPC ......... B64C 25/26; B64C 25/58; B64C 25/14; B64C 25/10
See application file for complete search history.

(56) References Cited

U.S. PATENT DOCUMENTS

| 3,870,254 A | 3/1975 | Watts |
| 2019/0144104 A1* | 5/2019 | Fortier .................... B64C 25/26 244/102 R |

FOREIGN PATENT DOCUMENTS

EP 3486166 A1 5/2019

OTHER PUBLICATIONS

Combined Search and Examination Report for Application No. GB2207423.1 dated Nov. 21, 2022, 5 pages.

* cited by examiner

*Primary Examiner* — Alentina Xavier
(74) *Attorney, Agent, or Firm* — Nixon & Vanderhye P.C.

(57) ABSTRACT

A landing gear assembly is disclosed having a trailing arm for carrying a wheel, a shock absorber pivotally coupled to the arm for damping movement of the arm, and an articulated lock mechanism. The mechanism includes an upper and lower lock links each with a distal end respectively pivotally coupled to the shock and arm. Proximal ends of the lock links are pivotally coupled about a common axis to enable a distance between the distal ends to vary. The mechanism is lockable to lock the assembly in an extended or retracted configuration. When the assembly is in the extended or retracted configuration, the mechanism is locked respectively in an extended or retracted locking configuration, such that the distance between the distal ends of the lock links is substantially the same in either extended or retracted locking configuration.

17 Claims, 8 Drawing Sheets

LANDING GEAR ASSEMBLY

CROSS RELATED APPLICATION

This application claims priority to United Kingdom Patent Application GB 2207423.1 filed May 20, 2022, the entire contents of which is hereby incorporated by reference.

BACKGROUND OF THE INVENTION

The present disclosure relates to a landing gear assembly. More particularly, but not exclusively, this invention concerns a trailing arm landing gear assembly comprising an articulated lock mechanism having substantially the same locking configuration in the extended configuration and separately in the retracted configuration of the landing gear assembly. The invention also concerns an aircraft comprising the landing gear assembly, and a method of operating a landing gear assembly.

An aircraft landing gear assembly supports the aircraft when landing by contacting the ground first and absorbing ground impact to reduce loads transmitted to the body of the aircraft. Retractable landing gear assemblies are complicated and comprise multiple components pivotally coupled to enable the landing gear to move from an extended configuration to a retracted configuration. The extended configuration is a configuration in which the landing gear is fully deployed from a landing gear bay of the aircraft (for example, for use during landing and taxiing). The retracted configuration is a configuration in which the landing gear is stowed in the landing gear bay of the aircraft (for example, for use in cruise). After take-off, the landing gear assembly will retract and before touchdown, the assembly will extend.

Once extended, the landing gear will experience landing gear loads when the aircraft makes contacts with and travels along the ground. During a working lifetime, the landing gear assembly will cyclically retract and extend and endure cyclical loading. Components of the landing gear assembly, and connections between such components, must not only be capable of safely transmitting initial impact loads, they must also reliably maintain the extended configuration, and separately, the retracted configuration. Some components of the landing gear assembly, perform alternative or additional functions to absorbing landing gear loads. Components providing an additional function may be strengthened to meet the performance demands; however, doing so can influence the weight of the landing gear assembly. It would therefore be advantageous to provide a mechanically simpler and/or lighter landing gear.

The present invention seeks to mitigate the above-mentioned problems. Alternatively or additionally, the present invention seeks to provide an improved landing gear assembly and/or improved method of operating a landing gear assembly.

SUMMARY OF THE INVENTION

The present invention provides according to a first aspect, a landing gear assembly. The assembly may comprise a trailing arm for carrying a wheel. The assembly may comprise a shock absorber. The shock absorber may be pivotally coupled to the trailing arm for damping movement of the trailing arm. The assembly may comprise an articulated lock mechanism. The lock mechanism may comprise an upper lock link and a lower lock link. The upper lock link may comprise a distal end and a proximal end. The distal end of the upper lock link may be pivotally coupled to the shock absorber. The lower lock link may comprise a distal end and a proximal end. The distal end of the lower lock link may be pivotally coupled to the trailing arm. The proximal ends of the upper and lower lock links may be pivotally coupled to each other about a common axis, such that relatively pivoting the upper and lower lock links about the common axis may cause a distance between the distal ends of the respective upper and lower lock links to vary. The articulated lock mechanism may be lockable to inhibit relative pivoting of the upper and lower lock links about the common axis and thereby lock the landing gear assembly in an extended configuration and, separately in a retracted configuration. The articulated lock mechanism may be lockable such that when the landing gear assembly is in the extended configuration the articulated lock mechanism is locked in an extended locking configuration. The articulated lock mechanism may be lockable such that, when the landing gear assembly is in a retracted configuration, the articulated lock mechanism is locked in a retracted locking configuration. The articulated lock mechanism may be lockable such that, in the extended and retracted locking configurations, the distance between the distal ends of the upper and lower lock links is substantially the same. The articulated lock mechanism may be lockable such that, in the extended and retracted locking configurations, the distance between the distal ends of the upper and lower lock links is the same.

Aircraft landing gear assemblies in accordance with the present invention may enable the assembly to be locked in the retracted configuration and, separately, in the extended configuration using (substantially) the same lock mechanism and arranging the lock mechanism in the (substantially) same way. Loads acting on the assembly are able to pass through a length of the lock mechanism when the assembly is locked in the retracted configuration and, separately, in the extended configuration. Such assemblies may be suitable for installation when comprising components that should avoid being subjected to the landing loads. Additionally or alternatively, the provision of a lock mechanism having the (substantially) same length in the retracted locking configuration and, separately, in the extended locking configuration provides an assembly that is compact and mechanically simple where all components have an efficiency load path.

Optional features of the first aspect and/or any other aspect are discussed below. Optional features may be combined. Optional features may be applied to any number of the aspects described herein.

The extended and retracted locking configurations may be (substantially) the same. The upper and lower lock links may be arranged relative to each other in (substantially) the same manner when the lock mechanism is in the retracted configuration and, separately, in the extended configuration.

The landing gear assembly may be arranged such that the distance between the distal ends of the upper and lower lock links varies as the landing gear assembly is moved between the extended and retracted configurations.

The articulated lock mechanism may comprise a hinge. The hinge may comprise a hinge member, such as a hinge pin. The proximal ends of the upper and lower lock links may be pivotally coupled to each other. The proximal ends of the upper and lower lock links may be pivotally coupled to the hinge. The distal ends of the upper and lower lock links may be arranged away from the hinge and rotatable with respect to each other about the hinge. The hinge may be a movable joint. The pivotal coupling of the upper and lower lock links, and optionally, the hinge member, may form the movable joint. The hinge may comprise the common axis about which the upper and lower lock links rotate relative to one another.

A lengthwise direction of each of the upper and lower lock links may be (substantially) parallel in the retracted locking configuration and, separately, in the extended locking configuration. The upper and lower lock links may be in a straight line in the retracted locking configuration and, separately, in the extended locking configuration. Beneficially, the lock mechanism may be stronger than a corresponding lock mechanism with upper and lower lock links that are not in a straight line in those configurations because the load is transferred along a straight line. A longitudinal axis of each of the upper and lower lock links may be (substantially) parallel in the retracted locking configuration and, separately, in the extended locking configuration. The longitudinal axes may be coaxial in the retracted locking configuration and, separately, in the extended locking configuration.

The lock mechanism may be arranged such that the upper and lower lock links can only fold in the same direction. The lock mechanism may be arranged such that the upper and lower lock links can only unfold in the same direction. The lock mechanism may be configured to fold in one rotational direction only. The lock mechanism may be configured to unfold in one rotational direction only. A folding direction of the upper and lower lock links may be opposite to an unfolding direction of the upper and lower lock links. The distal ends of the upper and lower lock links may pivot about the common axis by an angle of over 90 degrees when the assembly is moved between the extended configuration and retracted configuration. The landing gear assembly may be arranged such that the upper and lower lock links move towards or away from each other within (substantially) the same 180 degree range. The landing gear assembly may be arranged such that the upper and lower lock links move towards or away from each other without exceeding a range of less than 180 degrees. The lock mechanism may be configured so that the folding or unfolding rotational movement of the upper and lower lock links does not exceed 180 degrees.

The articulated lock mechanism may comprise only two lock links, the two lock links being the upper lock link and the lower lock link.

The trailing arm may be a lever to rotate about a trailing arm axis. The trailing arm may rotate about the trailing arm axis in response to contact with the ground and in response to surface changes of the ground when the assembly is in the extended configuration and the lock mechanism is in the extended locking configuration. When the articulated lock mechanism is locked, landing gear loads may be absorbed by the shock absorber.

When the articulated lock mechanism is arranged in each of the extended and retracted locking configurations, the distance between the distal ends of the upper and lower lock links may be equal to a maximum operable distance between the distal ends of the upper and lower lock links. The maximum operable distance may be a maximum distance between the distal ends of the upper and lower lock links that is present when the landing gear assembly is either in, or moves between, the extended and retracted configurations. When the articulated lock mechanism is arranged in each of the extended and retracted locking configurations, the distance between the distal ends of the upper and lower lock links may be substantially equal to a maximum length of the upper and lower lock links. The distance between the two distal ends may be at a maximum when the articulated lock mechanism is arranged in each of the extended and retracted locking configurations. When the articulated lock mechanism is arranged in each of the extended and retracted locking configurations, the common axis of the articulated lock mechanism may lie on a first plane that extends between the distal ends of the upper and lower lock links and may be (substantially) parallel to the common axis. When the articulated lock mechanism is arranged in each of the extended and retracted locking configurations, the common axis may be part way between the distal ends of the upper and lower lock links. When the articulated lock mechanism is arranged in each of the extended and retracted locking configurations, the common axis may be half way between the distal ends of the upper and lower lock links. When the articulated lock mechanism is arranged in each of the extended and retracted locking configurations, the common axis may be closer to the distal end of the upper lock link than to the distal end of the lower lock link.

The landing gear assembly may comprise a biasing member to bias the articulated lock mechanism towards the extended and retracted locking configurations. The biasing member may be a spring, such as a tension spring.

The articulated lock mechanism may comprise a switching mechanism switchable between a first mode and a second mode. When the switching mechanism is in the first mode, the biasing member biases the articulated lock mechanism towards the extended or retracted locking configurations. When the switching mechanism is in the second mode, the biasing member biases the articulated lock mechanism away from the extended or retracted locking configurations.

Switching the switching mechanism between the first mode and the second mode may determine whether the upper and lower lock links are pivotally constrained or pivotally unconstrained.

The switching mechanism may comprise an over-centre mechanism. The switching mechanism may comprise an actuator, such as a linear actuator. The actuator may be operable to switch the over-centre mechanism between a first biasing configuration and a second biasing configuration. The first and second biasing configurations may correspond to the first and second modes of the switching mechanism, respectively. The over-centre mechanism may be configured to put the lock mechanism in tension.

The over-centre mechanism may comprise the biasing member. The over-centre mechanism may comprise a crankshaft. The crankshaft may comprise a shaft or a plurality of shafts. The shaft may comprise a rotational axis of the crankshaft. Each of the plurality of shafts may comprise a longitudinal axis that is (substantially) parallel to each other of the plurality of shafts. The crankshaft may comprise three shafts, wherein one of the three shafts is offset from a rotational axis of the crankshaft. The three shafts may be elongate and extend in a direction (substantially) parallel to one another. The offset shaft may be referred to as an off-centre shaft and/or a crank pin. The crankshaft may comprise two shafts each coaxial with the rotational axis of the crankshaft. The crankshaft may comprise at least one web coupled to the biasing member to offset one end of the biasing member to the rotational axis of the crankshaft. The crankshaft may comprise at least one web coupled to at least one shaft. The crankshaft may comprise two webs. Each of the two webs may be coupled to two of the three shafts. The or each webs may be eccentric. The or each web may be elliptical in shape. The or each web may be planar. The biasing member may be coupled to the one of the three shafts that is offset from the rotational axis of the crankshaft.

The crankshaft may comprise a lever to rotate the crankshaft about the rotational axis. The actuator of the switching mechanism may engage the lever of the crankshaft. The actuator may extend and retract to move the lever and rotate the crankshaft about the rotational axis. The actuator may be pivotally coupled at both ends. The actuator may be pivotally coupled at one end to one of the upper and lower lock links and to the lever at an opposite end of the actuator. The crankshaft may be coupled to only one of the upper or lower lock links. The actuator may be pivotally coupled to the same one of the upper and lower lock links as the crankshaft is coupled to the upper and lower lock links. The biasing member may interconnect the upper and lower lock links.

Each of the upper and lower lock links may comprise an end stop to prevent relative rotation of another component of the lock mechanism. One or both of the upper and lower lock link may comprise an end stop to prevent relative rotation of the upper and lower lock links. One or both of the upper and lower lock link may comprise an end stop to prevent relative rotation of the upper lock link and lever of the crankshaft. The end stop may be a protuberance. The protuberance may project from an external side surface of the respective upper and/or lower lock link. The upper or lower lock link may comprise a receiving portion for receiving the protuberance. The receiving portion may be a hooked portion comprising a recess.

The upper and/or lower lock link may comprise two fork portions. Each fork portion may be planar. One of the fork portions of one of the upper and/or lower lock link may comprise an end stop. The end stop may be in the form of a protuberance. The protuberance may project from an external side surface of the fork portion. The lever of the crankshaft may engage with one end stop at a time. Each fork portion of the upper or lower lock link may comprise a receiving portion for receiving a protuberance on the other one of the upper or lower lock link. One of the upper and/or lower lock link may comprise a cross-member between two fork portions. One end of the biasing member may be pivotally coupled to the cross-member. The actuator of the switching mechanism may be pivotally coupled to one fork portion of the upper or lower lock link.

The over-centre mechanism is arranged such that when the articulated lock mechanism is in the retracted locking configuration, and separately, in the extended locking configuration, the biasing member is over-centre. The biasing member may be over-centre when a direction of tension of the biasing member is angled to a common plane passing through the common axis of the articulated lock mechanism and the rotational axis of the crankshaft. Alternatively, or additional, the biasing member may be over-centre when one end of the biasing member is outside of the common plane. The biasing member may be statically over-centre in two extremes. When the biasing member is over-centre in one of the two extremes, the lever of the crankshaft may engage with one end stop. When the biasing member is over-centre in each of the two extremes, the lever of the crankshaft may engage with each of two end stops.

The landing gear assembly may comprise an aircraft link comprising a first portion pivotally coupled to the distal end of the upper lock link, and a second portion pivotally mountable to an aircraft at an upper aircraft joint. The pivotal coupling of the second portion of the aircraft link, the distal end of the upper lock link, and the shock absorber may together form a movable joint. The movable joint may be movable relative to the upper aircraft joint. A second plane may extend between the upper aircraft joint and the distal end of the lower lock link and may be (substantially) parallel to the common axis of the articulated lock mechanism. When the articulated lock mechanism is in the extended locking configuration, the movable joint may be located on one side of the second plane. When the articulated lock mechanism is in the retracted locking configuration, the movable joint may be located on the other side of the second plane.

The landing gear assembly may be further pivotally mountable to the aircraft at a lower aircraft joint. The lower aircraft joint may be formed by the pivotal coupling of the lower lock link and the trailing arm. The movable joint may be movable relative to the lower aircraft joint.

The landing gear assembly may comprise an actuator pivotally mountable to the aircraft at a third aircraft joint and pivotally coupled to the movable joint. The actuator may be arranged to directly move the movable joint through the second plane by extending and retracting with respect to the third aircraft joint. The actuator may be a linear actuator. The linear actuator may be in an extended and/or expanded configuration when the landing gear assembly is in the extended configuration. The movable joint may be movable relative to the third aircraft joint.

The aircraft link may be a double-acting aircraft link. The landing gear assembly may comprise an actuator pivotally mountable to the aircraft at a third aircraft joint. The actuator may be pivotally coupled to a third portion of the double-acting aircraft link. The actuator may be arranged to pivot the double-acting aircraft link about the upper aircraft joint. The actuator may cause the movable joint to indirectly move through the second plane by extending and retracting with respect to the third aircraft joint. The actuator may be a linear actuator. The linear actuator may be in a retracted and/or compressed configuration when the landing gear assembly is in the extended configuration. The landing gear assembly may comprise two movable joints. Each of the two movable joints may be movable relative to the upper, lower, and/or third aircraft joints. The articulated lock mechanism and the double-acting aircraft link may be pivotally coupled to form a first movable joint. The actuator and double-acting aircraft link the may be pivotally coupled to form a second movable joint. The actuator may directly move the second movable joint and indirectly move the first movable joint.

The common axis of the lock mechanism, an axis of the movable joint formed by the shock absorber, aircraft link, and lock mechanism, and an axis of the lower aircraft joint (for example, the trailing arm axis) may be joined by a straight line when the lock mechanism is in the retracted locking configuration and, separately, in the extended locking configuration. Beneficially, the lock mechanism may be stronger than when the common axis of the lock mechanism is away from a straight line between the axis of the movable joint formed by the shock absorber, aircraft link, and lock mechanism, and an axis of the lower aircraft joint.

The common axis of the lock mechanism, an axis of the movable joint formed by the shock absorber, aircraft link, and lock mechanism, and an axis of the lower aircraft joint (for example, the trailing arm axis) may be parallel and offset with respect to each other when the lock mechanism is in the retracted locking configuration and, separately, in the extended locking configuration. Beneficially, the lock mechanism robustly separately holds each of the retracted and extended configurations of the landing gear assembly.

All rotation of the landing gear assembly between the retracted and extended configurations may take place about axes that are parallel. The common axis of the lock mechanism may be parallel to: an axis of the movable joint formed by the shock absorber, aircraft link, and lock mechanism;

and/or an axis of the lower aircraft joint (for example, the trailing arm axis); and/or an axis of the upper aircraft joint; and/or an axis of the third aircraft joint; and/or an axis of the movable joint formed by the actuator and the aircraft link (such as the double-acting aircraft link).

The trailing arm, the shock absorber, and the articulated lock mechanism may relatively pivot (substantially) parallel to a common plane from the extended configuration to the retracted configuration of the landing gear assembly. The landing gear assembly may be constrained such that each of the trailing arm, the shock absorber, and the articulated lock mechanism move along a plane. Each of the respective planes may be (substantially) parallel to each other.

The articulated lock mechanism may be in tension when the landing gear assembly is arranged in the extended configuration and the articulated lock mechanism is arranged in the extended locking configuration, and wherein the articulated lock mechanism is in tension when the landing gear assembly is arranged in the retracted configuration and the articulated lock mechanism is arranged in the retracted locking configuration. The landing gear assembly may be configured such that the upper and lower lock links are in tension in the extended and retracted locking configurations and the landing gear assembly is arranged in the extended and retracted locking configuration, respectively. The articulated lock mechanism may be in tension when the landing gear assembly is arranged in, and separately between, the extended and retracted configurations.

The landing gear assembly may comprise only one wheel or only two wheels or a plurality of wheels, for example three or four wheels. The one wheel, or each of the wheels may be carried by the trailing arm.

According to a second aspect of the invention, an aircraft is provided. The aircraft may comprise any feature of the first aspect or any other aspect.

The aircraft may be a commercial passenger aircraft, for example an aircraft configurable to carry more than fifty passengers, for example more than one hundred passengers. It may be that the aircraft is a fixed wing aircraft. It may be that the aircraft is a blended wing aircraft. It may be that the aircraft landing gear assembly is a wing mounted landing gear (i.e. mounted wholly or partially to a wing of the aircraft), a fuselage mounted landing gear (i.e. mounted wholly or partially to the fuselage of the aircraft landing gear assembly) and/or a nose landing gear (e.g. a steerable aircraft landing gear assembly).

The aircraft may comprise first and second landing gear assemblies of the first aspect of the present invention, the first aircraft landing gear assembly being located on the port side of the aircraft and the second aircraft landing gear assembly being located on the starboard side of the aircraft. Those skilled in the art will realise that certain larger aircraft may be provided with further landing gear assembly in addition to the first and second aircraft landing gear assemblies.

According to a third aspect of the invention, a method of operating a landing gear assembly is provided. The landing gear assembly may comprise a trailing arm carrying a wheel, a shock absorber pivotally coupled to the trailing arm, and/or an articulated lock mechanism. The articulated lock mechanism comprise an upper lock link, and a lower lock link. The upper lock link may comprise a distal end and a proximal end. The distal end of the upper lock link may be pivotally coupled to the shock absorber. The lower lock link may comprise a distal end and a proximal end. The distal end of the lower lock link may be pivotally coupled to the trailing arm. The proximal ends of the upper and lower lock links may be pivotally coupled to each other about a common axis. It may be that, in an extended configuration of the landing gear assembly, the articulated lock mechanism is locked in an extended locking configuration to thereby lock the landing gear assembly in the extended configuration and the distal ends of the upper and lower lock links are displaced by a first distance. It may be that unlocking the articulated lock mechanism thereby releasing the landing gear from the extended configuration, and moving the landing gear assembly to a retracted configuration causes a distance between the distal ends of the upper and lower lock links to vary. It may be that the moving causes the distal ends of the upper and lower lock links to vary in distance until the distal ends return to substantially the first distance when the landing gear assembly is in the retracted configuration and the articulated lock mechanism is locked in a retracted locking configuration to thereby lock the landing gear assembly in the retracted configuration. It may be that the moving causes the distal ends of the upper and lower lock links to vary in distance until the distal ends return to the first distance.

It may be that the landing gear assembly comprises a switching mechanism comprising a biasing member. It may be that in the extended locking configuration, the switching mechanism is in a first mode in which the biasing member biases the articulated lock mechanism towards the extended locking configuration. It may be that the unlocking the articulated lock mechanism comprises switching the switching mechanism to a second mode to cause the biasing member to bias the articulated lock mechanism away from the extended locking configuration.

It may be that the landing gear assembly comprises an aircraft link comprising a first portion pivotally coupled to the distal end of the upper lock link, and a second portion. The second portion may be pivotally mountable to an aircraft at an upper aircraft joint. The pivotal coupling of the second portion of the aircraft link, the distal end of the upper lock link, and the shock absorber may together form a movable joint. It may be that the landing gear assembly comprises an actuator pivotally mountable to the aircraft at a third aircraft joint and pivotally coupled to the aircraft link, for example to the movable joint. It may be that the landing gear assembly is further pivotally mountable to the aircraft at a lower aircraft joint. The lower aircraft joint may be formed by the pivotal coupling of the lower lock link and the trailing arm. It may be that moving the landing gear assembly to the retracted configuration causes the movable joint to be moved by the actuator relative to the upper aircraft joint. It may be that the articulated lock mechanism is locked in the extended locking configuration by holding the movable joint in position relative to the upper and lower aircraft joints. This may enable landing gear loads to be transferred to the aircraft through the trailing arm, the shock absorber, the upper and lower lock links of the articulated lock mechanism, and the aircraft link. The landing gear loads may bypass the actuator. Beneficially, the landing gear assembly comprises a load path that avoids the actuator when in the extended configuration and the lock links are locked under tension. The landing gears loads may bypass the actuator without subjecting the linear actuator to any of such loads when the landing gear assembly is locked in the extended configuration and/or the retracted configuration.

It may be that the landing gear assembly comprises a double-acting aircraft link. It may be that the pivotal coupling of a second portion of the double-acting aircraft link, the distal end of the upper lock link, and the shock absorber together form a first movable joint. It may be that the pivotal coupling of a third portion of the double-acting aircraft link and the actuator form a second movable joint. It may be that pivotal movement of the first movable joint and the second movable joint is proportional, for example identical. It may be that the actuator, directly coupled to the second movable joint, causes the double-acting aircraft link to pivot about the upper aircraft joint and indirectly pivot the first movable joint.

According to a fourth aspect of the invention, a landing gear assembly is provided. The landing gear assembly may comprise a trailing arm. The trailing arm may comprise a first end pivotally mountable to an aircraft about a trailing arm axis. The trailing arm may comprise a second end carrying a rotatable wheel. The landing gear assembly may comprise a shock absorber. The shock absorber may be pivotally coupled to the trailing arm for damping rotation of the trailing arm about the trailing arm axis. The landing gear assembly may comprise a link comprising a first end pivotally mountable to an aircraft. The link may comprise a second end pivotally coupled to the shock absorber about a movable axis. The landing gear assembly may comprise an articulated lock mechanism. The articulated lock mechanism may comprise two links hinged about a joint, for example, the interconnection between the two links that enables a pivotal coupling. The articulated lock mechanism may be operable in a locking configuration to inhibit rotation of the two links about the joint. One of the links may be pivotally coupled to the trailing arm about the trailing arm axis. Another one of the links may be pivotally coupled to the shock absorber about the movable axis. When the landing gear assembly is arranged in each of an extended configuration and a retracted configuration, the articulated lock mechanism may be arranged in a substantially identical locking configuration to thereby lock the landing gear assembly in the extended configuration and, separately in the retracted configuration, respectively. When the landing gear assembly is arranged in each of an extended configuration and a retracted configuration, the articulated lock mechanism may be arranged in an identical locking configuration to thereby lock the landing gear assembly in the extended configuration and, separately in the retracted configuration, respectively.

The landing gear assembly is configured such that the identical locking configuration comprises a length of the articulated lock mechanism that is (substantially) the same when the landing gear assembly is arranged in each of the extended configuration and retracted configurations.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
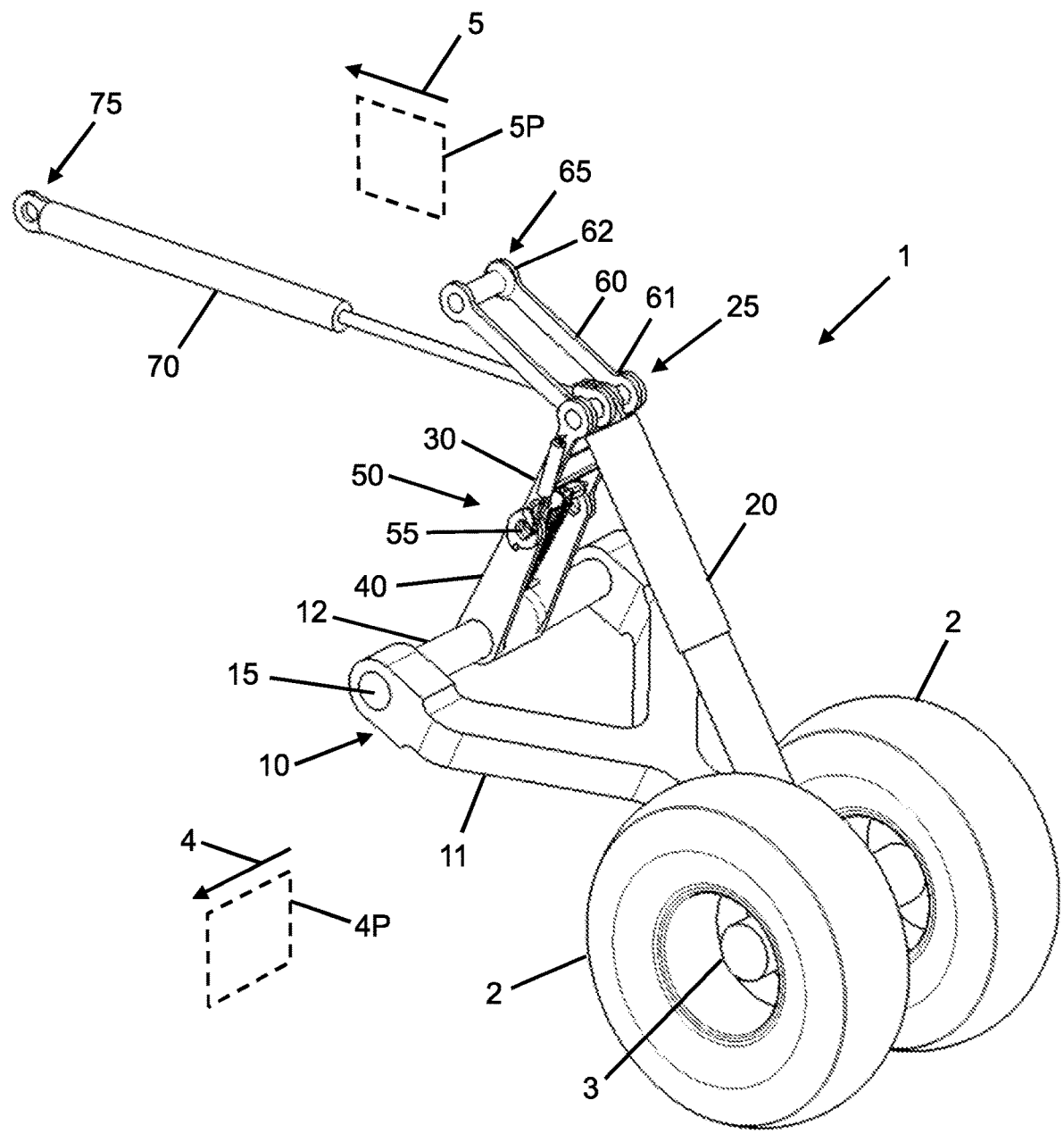
FIG. 1 shows a perspective view of a landing gear assembly according to a first embodiment of the invention, when the landing gear assembly in in an extended configuration.

FIG. 1 shows a perspective view of a landing gear assembly 1 according to a first embodiment, when the landing gear assembly 101 is in an extended configuration. The assembly 1 is shown fully extended before making contact with the ground, such that the assembly 1 is deployed ready for landing but the weight of the aircraft is not yet on the wheels.

The landing gear assembly 1 has a spanwise direction 4 extending in a spanwise plane 4P, and a lengthwise direction 5 extending in a lengthwise plane 5P. The lengthwise direction 5 corresponds to a longitudinal direction of an aircraft to which the assembly 1 is to be attached, such as the aircraft 200 shown in FIG. 6 and described below. The spanwise direction 4 is perpendicular to the lengthwise direction 5.

The landing gear assembly 1 comprises two wheels 2, a trailing arm 10, a shock absorber 20, an articulated lock mechanism 50, an aircraft link 60, and a linear actuator 70. The two wheels 102 are rotatably mounted to and spaced apart from each other along an axle 3 in the spanwise direction 4. The assembly 1 can be said to comprise a trailing-arm suspension, wherein the shock absorber 20 acts against the trailing arm 10.

The lock mechanism 50 comprises an upper lock link 30, a lower lock link 40, and a hinge 55. The hinge 55 comprises a hinge member interconnecting the upper and lower lock links 30, 40. The upper and lower lock links 30, 40 each comprise a proximal end and a distal end. The proximal ends are pivotally coupled to the hinge 55. The distal ends are arranged away from the hinge 55 and are rotatable with respect to each other about the hinge 55. The hinge 55 is a first movable joint and comprises a common axis about which the upper and lower lock links 30, 40 rotate relative to one another.

The trailing arm 10 carries the wheels 2 that make contact with the ground on landing. The trailing arm 10 is pivotally coupled to a distal end of the shock absorber 20 at a distal end of the trailing arm 10. The trailing arm 10 is pivotally coupled to the lock mechanism 50 at a proximal end of the trailing arm 10. The trailing arm 10 comprises a bifurcated body 11 with a Y-shape and a cross-member 12, wherein the distal end of the trailing arm 10 is the end that carries the wheels 2. The cross-member 12 extends in the spanwise direction 4 from an inboard side of the bifurcated body 11 to an outboard side of the bifurcated body 11. The cross-member 12 interconnects the bifurcated body 11 to the lock mechanism 50.

The lock mechanism 50 is pivotally coupled to the trailing arm 10 and shock absorber 20 and interconnects the trailing arm 10 and shock absorber 20. The hinge 55 is located mid-way along a length of the lock mechanism 50. The lower lock link 40 of the lock mechanism 50 is pivotally coupled to the bifurcated body 11 of the trailing arm 10 via the cross-member 12. The upper lock link 30 of the lock mechanism 50 is pivotally coupled to a proximal end of the shock absorber 20.

The linear actuator 70 and a first portion 61 of the aircraft link 60 is pivotally coupled to the upper lock link 30 of the lock mechanism 50 and the shock absorber 20. The pivotal coupling of the shock absorber 20, the lock mechanism 50, the aircraft link 60, and the linear actuator 70 together form a second movable joint 25. That is, the linear actuator 70 is arranged to directly move the second movable joint 25.

In use, the trailing arm 10, a second portion 62 of the aircraft link 60, and the linear actuator 70 are each pivotally coupled to a fuselage of the aircraft at respective joints 15, 65, 75. The trailing arm 10 is pivotally mountable to the aircraft at a lower aircraft joint 15. The aircraft link 60 is pivotally mountable to the aircraft at an upper aircraft joint 65. The linear actuator 70 is pivotally mountable to the aircraft at a third aircraft joint 75. Each aircraft joint 15, 65, 75 is pivotally fixed to the aircraft structure. In this embodiment, the aircraft structure is the landing gear bay. In other embodiments, the aircraft structure may include the landing gear bay and/or the fuselage and/or the wing.

Figure 2A:
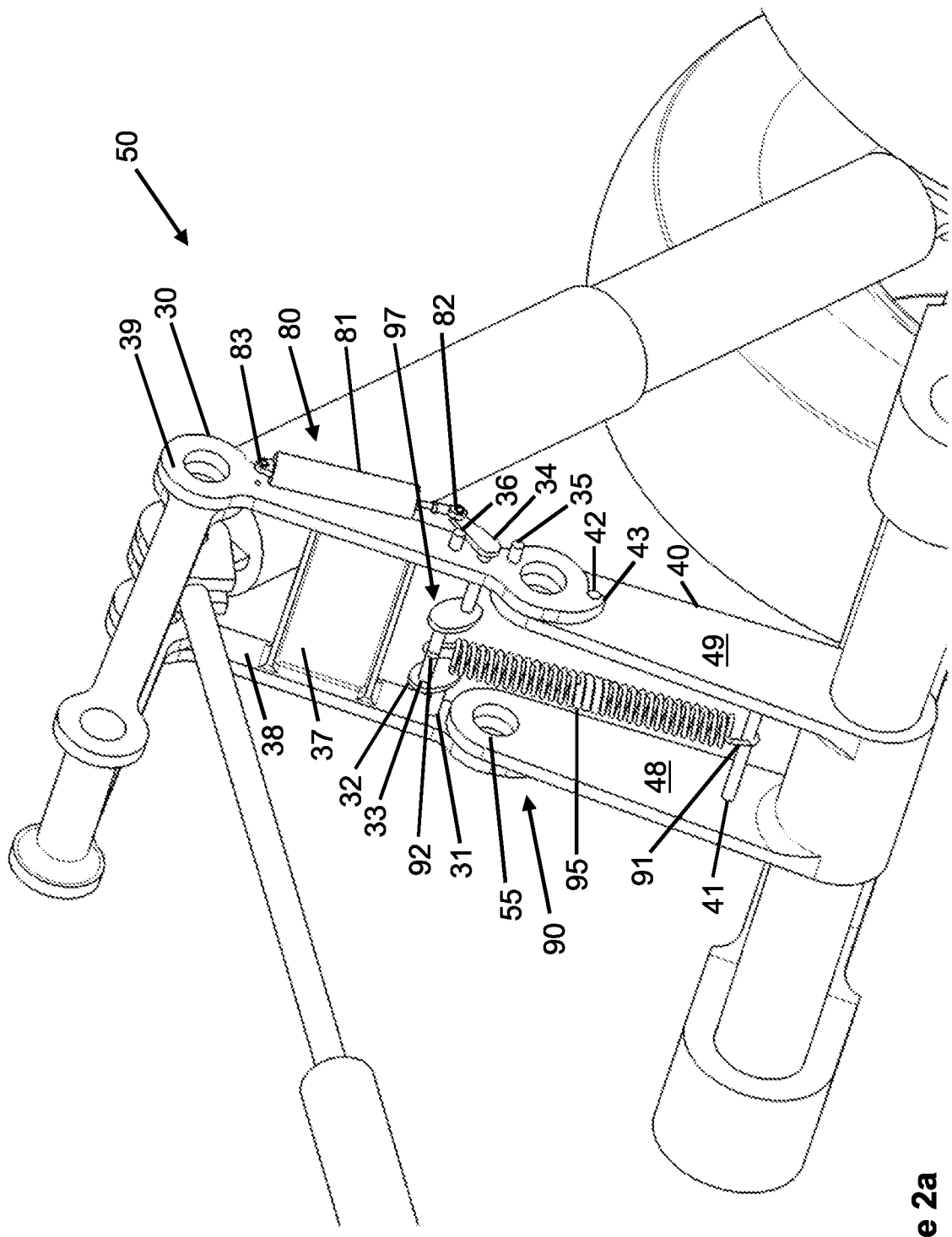
FIG. 2a shows a first mode of an over-centre lock mechanism of the landing gear assembly according to the first embodiment.
Figure 2B:
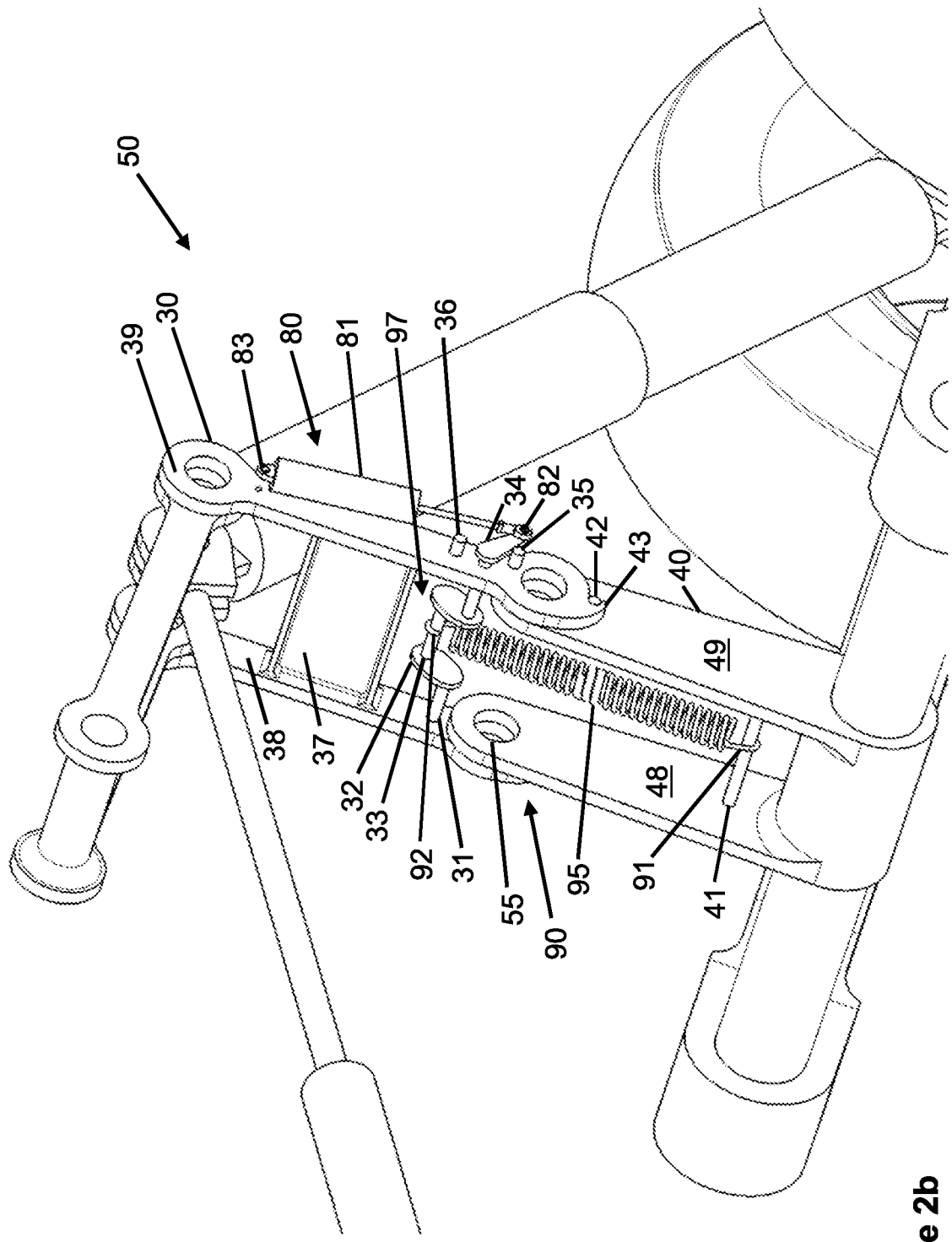
FIG. 2b shows a second mode of the over-centre lock mechanism of the landing gear assembly according to the first embodiment.

The lock mechanism 50 comprises a switching mechanism 80. FIGS. 2a and 2b show a first mode and a second mode of the switching mechanism 80, respectively. The switching mechanism 80 comprises a linear actuator 81, and an over-centre mechanism 90. The actuator 81 is operable to switch the over-centre mechanism 90 between a first biasing configuration and a second biasing configuration, wherein each of the first and second biasing configurations correspond to the first and second modes of the switching mechanism 80, respectively.

Each of the upper and lower lock links 30, 40 comprises a cross-member 37, 41, a first fork portion 38, 48 and a second fork portion 39, 49. The cross-member 37 of the upper lock link 30 is generally planar and extends along the longitudinal direction of the first and second fork portions 38, 39 of the upper lock link 30. The cross-member 41 of the lower lock link 40 is an elongate rod and extends perpendicular to the longitudinal direction of the first and second fork portions 48, 49 of the lower lock link 40. The first fork portion 38, 48 of each of the upper and lower lock links 30, 40 is spaced apart from the respective second fork portion 39, 49 by a void. Each cross-member 37, 41 is located in the respective void and extends between and is mounted to the respective first fork portion 38, 48 and second fork portion 39, 49. The cross-member 37, 41 provides structural rigidity to the respective upper and lower lock link 30, 40.

The over-centre mechanism 90 comprises a biasing member 95, and a crankshaft 97. The biasing member 95 is a tension spring. The biasing member 95 comprises a first hook 91 engaged with the cross-member 41 of the lower lock link 40 and a second hook 92 engaged with the crankshaft 97. The biasing member 95 is located in the voids between the first 38, 48 and second 39, 49 fork portions the upper and lower lock links 30, 40.

The crankshaft 97 comprises two central shafts 31, two crank webs 32, an off-centre shaft 33, and a lever 34. The two central shafts 31 are pivotally coupled to the upper lock link 30. The crankshaft 97 extends between the first and second fork portions 38, 39. The central shaft 31 pivotally coupled to the first fork portion 38, a portion of the other central shaft 31 pivotally coupled to the second fork portion 39, the two webs 32, and the off-centre shaft 33 are all located in the void between the first and second fork portions 38, 39. The other portion of the other central shaft 31 passes through a hole in the second fork portion 39 and protrudes eternally from the second fork portion 39 to the lever 34. The lever 34 pivotally engages with the actuator 81. The actuator 81 is pivotally coupled at an upper end 83 to the upper lock link 30 and to the lever 34 at a lower end 82. Each central shaft 31 is rigidly coupled to a web 32, and each web 32 is rigidly coupled to the off-centre shaft 33. The second hook 92 of the biasing member 95 is engaged with the off-centre shaft 33 between the two webs 32.

The two central shafts 31 and the off-centre shaft 33 are elongate and extend in a parallel direction to each other. The two central shafts 31 are collinear and comprise a common axis. The off-centre shaft 33 is offset from the two central shafts 31 and the common axis by the two webs 33. Each web 33 is eccentric and elliptical in shape. The offset of the off-centre shaft 33 from the two central shafts 31 enables the off-centre shaft 33 to rotate around the common axis of the two central shafts 31. The hinge 55 of the lock mechanism 50 also comprises an axis, which is a common axis about which the upper and lock links 30, 40 rotate with respect to each other. The common axis corresponds to the longitudinal axis of the hinge member. The common axes of the two central shafts 31 and the lock mechanism 50 are parallel and spaced apart from one another.

Each of the upper and lower lock links 30, 40 comprises an end stop to prevent relative rotation of another component of the lock mechanism 50. The lower lock link 40 comprises an end stop to prevent relative rotation of the upper and lower lock links 30, 40. The upper lock link 30 comprises an end stop to prevent relative rotation of the upper lock link 30 and lever 34. Each of the first fork portion 48 and second fork portion 49 comprises an end stop in the form of a protuberance 42 projecting from each external side surface of the lower lock link 40. The upper lock link 30 comprises a hooked portion 43 comprising a recess for receiving the protuberance 42. The second fork portion 39 comprises two end stops each in the form of a protuberance 35, 36 projecting from an external side surface of the second fork portion 39. The lever 34 engages with one of the protuberances 35, 36 at a time.

The lock mechanism 50 is locked in an extended locking configuration in the view shown in FIG. 2a and is unlocked in FIG. 2b. The lock mechanism 50 is additionally configured to separately lock in a retracted locking configuration demonstrated by FIG. 3c and discussed below.

When locked, the protuberance 42 of the lower lock link 40 is pressed against walls of the recess of the hooked portion 43 of the upper lock link 30 to inhibit relative rotation of the upper and lower lock links 30, 40. When unlocked, the force exerted by the protuberance 42 of the lower lock link 40 against the walls of the recess of the hooked portion 43 of the upper lock link 30 is removed and the upper and lower lock links 30, 40 are free to rotate relative one another. Switching the switching mechanism 90 between the first mode and the second mode determines whether the upper and lower lock links 30, 40 are pivotally constrained or pivotally unconstrained.

The over-centre mechanism 90 is arranged such that the longitudinal axis of the cross-member 41, the common axis of the two central shafts 31, and the common axis of the hinge 55 extend along a common plane when the lock mechanism 50 is locked in the extended locking configuration, as shown in FIG. 2*a*. When the lock mechanism 50 is unlocked, the upper and lower lock links 30, 40 initially remain in their relative positions, as shown in FIG. 2*b*, before their distal ends pivot relative to each other about the hinge 55. The longitudinal axis of the cross-member 41, the common axis of the two central shafts 31, and the common axis of the hinge 55 remain within the common plane when the lock mechanism 50 is initially unlocked. The longitudinal axis of the off-centre shaft 33 is not constrained to that common plane and is capable of moving either side of that common plane to lock or unlock the lock mechanism 50. The over-centre mechanism 90 can be in either the first or second biasing configurations when the lock mechanism 50 is unlocked. The over-centre mechanism 90 must be in the first biasing configuration to lock the lock mechanism 50.

In the first mode of the switching mechanism 80 (the first biasing configuration of the over-centre mechanism 90), as shown in FIG. 2*a*, the actuator 81 has retracted to cause the lever 34 to engage with the protuberance 36. This results in the crankshaft 97 rotating in an anti-clockwise direction, when looking at the side of the lock mechanism 50 that the actuator 81 is located. This anti-clockwise rotation of the crankshaft 97 moves the off-centre shaft 33 to one side of the aforementioned common plane. The biasing member 95, under tension, urges the upper lock link 30 in the anti-clockwise direction about the hinge 55 and puts the biasing member 95 in a first state of bias to lock the lock mechanism 50. This causes the protuberance 42 of the lower lock link 40 to be pressed against walls of the recess of the hooked portion 43 of the upper lock link 30 and inhibit relative rotation of the upper and lower lock links 30, 40. When the lock mechanism 50 is locked, the longitudinal directions of the upper and lower lock links 30 are parallel to each other.

When switching to the second mode of the switching mechanism 90, as shown in FIG. 2*b*, the actuator 81 extends to cause the lever 34 to engage with the other protuberance 35. This results in the crankshaft 97 rotating in a clockwise direction, when looking at the side of the lock mechanism 50 that the actuator 81 is located. This clockwise rotation of the crankshaft 97 moves the off-centre shaft 33 to the other side of the aforementioned common plane. When switching the switching mechanism 80 from the first mode, shown in FIG. 2*a*, to the second mode, shown in FIG. 2*b*, the biasing member 95 extends to a maximum. The maximum extension of the biasing member 95 occurs when the longitudinal axes of the off-centre shaft 33, the two central shafts 31, and the cross-member 33 are in the same plane. When the off-centre shaft 33 is moved to either side of that plane, the biasing member 95 retracts away from the maximum extension, while still under tension, but to a lesser degree than when at the maximum.

When the biasing member 95, under tension, is moved to the other side of the common plane and is put in a second state of bias, as shown in FIG. 2*b*, the biasing member 95 urges the upper lock link 30 in the clockwise direction about the hinge 55, when looking at the side of the lock mechanism 50 that the actuator 81 is located. This causes the reaction force, exerted by the protuberance 42 of the lower lock link 40 against the walls of the recess of the hooked portion 43 of the upper lock link 30, to be removed. The upper and lower lock links 30, 40 then freely rotate relative one another about the hinge 55, such that the distal ends of the upper and lower lock links 30, 40 are brought together. The lock mechanism 50 is thus only able to fold in one rotational direction and unfold in only one rotational direction. This enables the landing gear assembly 1 to be constrained and held in either of the extended or retracted configurations at any one time.

Figure 3A:
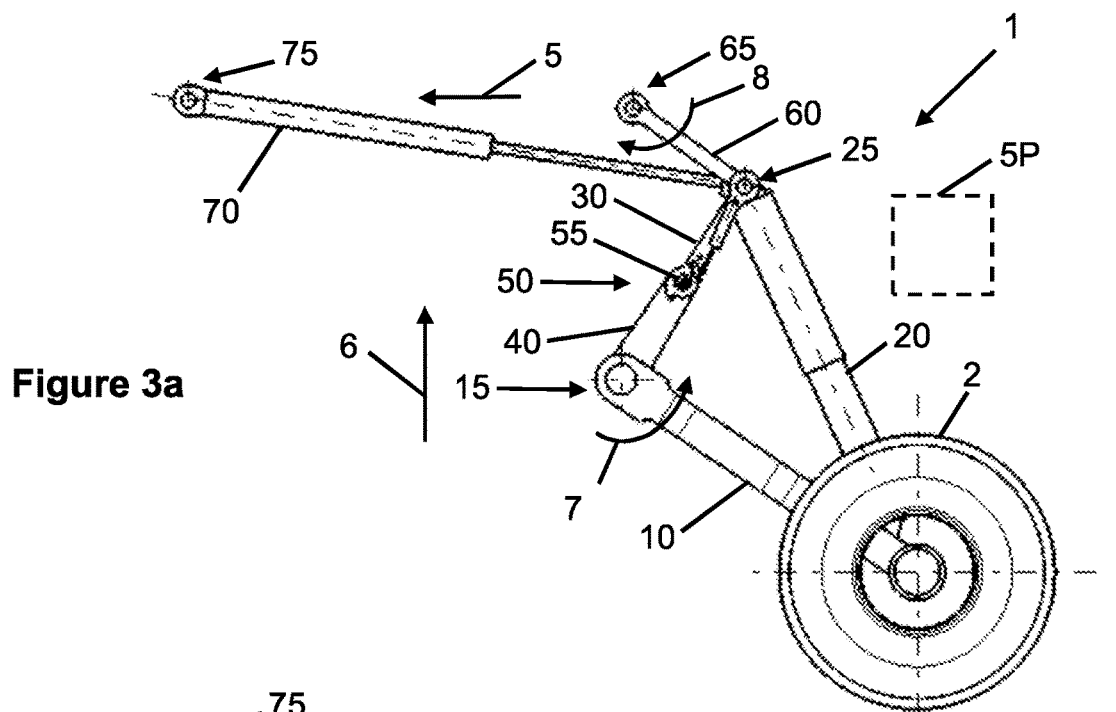
FIGS. 3a to 3c each show an outboard side view of a successive stage of retraction of the landing gear assembly according to the first embodiment.
Figure 3B:
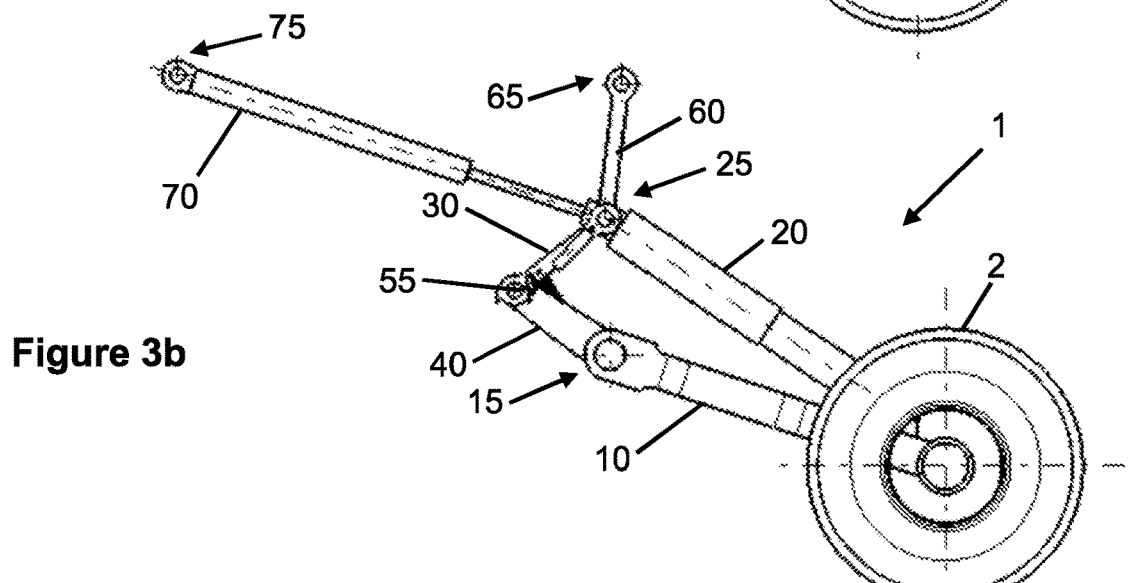
Figure 3C:
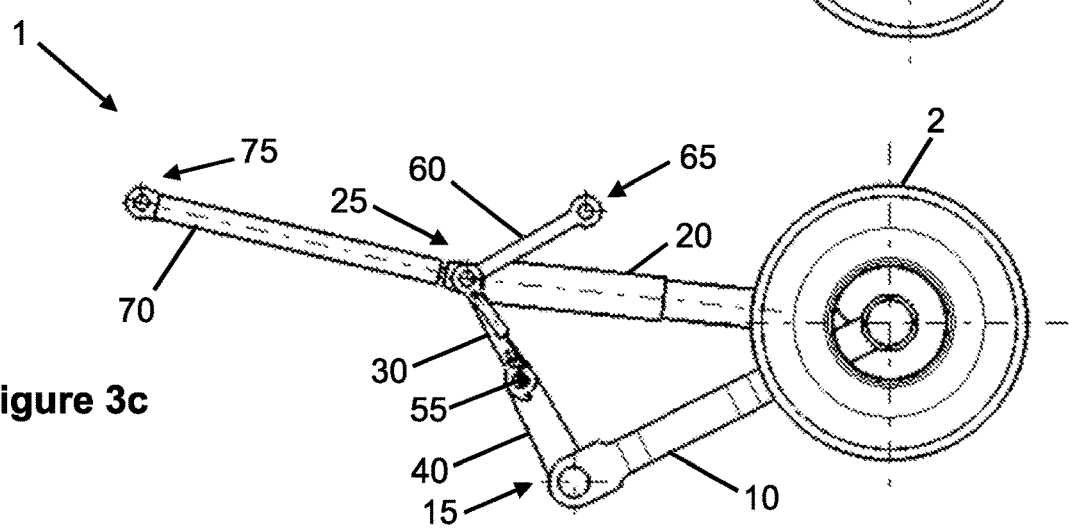

FIGS. 3*a* to 3*c* each show an outboard side view of a successive stage of retraction of the landing gear assembly 1. In FIG. 3*a*, the assembly 1 is in the extended configuration, corresponding to FIGS. 1 and 2*a*. In FIG. 3*c*, the assembly 1 is in the retracted configuration. In FIG. 3*b*, the assembly 1 is in an intermediate configuration between the extended and retracted configurations. In the extended and retracted configurations, shown in FIGS. 3*a* and 3*c*, the lock mechanism 50 is locked in the extended and retracted locking configurations respectively, and the switching mechanism 80 is in the first mode. In the extended and retracted locking configurations, the relative arrangement of the various components of the lock mechanism 50 is identical. This enables the lock mechanism 50 to have the same locking performance in both the retracted and extended configurations of the assembly 1. Thus, landing gear loads transfer along the whole length of the upper and lower lock links 30, 40 and in the same direction. In the intermediate configuration, shown in FIG. 3*b*, the switching mechanism 80 is in the second mode.

When the assembly 1 moves between the retracted and extended configurations, the lock mechanism 50 folds and the hinge 55 moves from right-to-left and then back to the right before unfolding again when the upper and lower lock links 30, 40 re-align. As the lock mechanism 50 folds, a distance between the distal ends of the upper and lower lock links 30, 40 varies. This causes a single straight-line length of the lock mechanism 50 to decrease. As the lock mechanism 50 unfolds, the single straight-line length of the lock mechanism 50 increases, and the distance between the distal ends of the upper and lower lock links 30, 40 increases to a maximum operable distance.

When the landing gear assembly 1 is in extended configuration, the linear actuator 70 is extended compared to the retracted and intermediate configurations. This puts the second movable joint 25 and hinge 55 (the first movable joint) of the lock mechanism 50 to the right of a plane between the axes of the upper and lower aircraft joints 65, 15. In the intermediate configuration, the second movable joint 25 and hinge 55 are moved to towards that plane and the hinge 55 is further from that plane. In the extended configuration, the second movable joint 25 is moved further from that plane and the hinge 55 is drawn back towards that plane.

When the landing gear assembly 1 is in extended configuration, the lock mechanism 50 is locked in the extended locking configuration, the switching mechanism 80 is in the first mode, and the over-centre mechanism 90 is in the first biasing configuration, as shown in FIG. 2*a*. When the aircraft is airborne, there is no weight on the wheels 2 and the assembly 1 can retract. To move the assembly 1 away from the extended configuration, the lock mechanism 50 is unlocked by switching the switching mechanism 80 to the second mode, and putting the over-centre mechanism 90 in the second biasing configuration, as shown in FIG. 2*b*. The lock mechanism 50 is configured to constrain the linear actuator 70 and inhibit retraction of the linear actuator 70.

When the landing gear assembly 1 is in extended configuration and the lock mechanism 50 is locked in the extended locking configuration, the lock mechanism 50 holds the second movable joint 25 in position relative to the upper, lower and third aircraft joints 65, 15, 75. This enables landing gear loads to be transferred to the aircraft through the trailing arm 10, the shock absorber 20, the upper and lower lock links 30, 40 of the lock mechanism 50, and the aircraft link 60 and bypass the linear actuator 70. Beneficially, landing gear loads are not passed through the linear actuator 70 when the landing gear assembly 1 is locked in the extended configuration.

When the lock mechanism 50 is unlocked, the constraint imposed by the lock mechanism 50 is removed and the linear actuator 70 is able to retract predominately in the lengthwise direction 5. Due to the constraints imposed by the upper and lower aircraft joints 65, 15 on the freedom of movement of the landing gear assembly 1, when the lock mechanism 50 is unlocked and the linear actuator 70 is retracted, the second movable joint 25 moves towards the third aircraft joint 75, as successively shown in FIGS. 3b and 3c. The wheels 2 are rotated in an anticlockwise direction 7 about the lower aircraft joint 15 and the aircraft link 60 rotates in a clockwise direction 8 about the upper aircraft joint 65 and towards the third aircraft joint 75. This causes the wheels 2 to move upwards in a vertical direction 6. The shock absorber 20 inhibits rotation of the wheels 2 by damping movement of the trailing arm 10. In the intermediate configuration, the lock mechanism 50 is unfolded, binging the distal ends of the upper and lower lock links 30, 40 together, and the second movable joint 25 is closer to the lower aircraft joint 15 than compared to the extended and retracted configurations. When the assembly 1 is moved to the retracted configuration by the retraction of the linear actuator 70, as shown in FIG. 3c, the lock mechanism 50 is locked in the retracted locking configuration by switching the switching mechanism 80 to the second mode and the over-centre mechanism 90 to the second biasing configuration. This enables the lock mechanism 50 to fix the assembly 1 in position without effort from the linear actuator 70.

The movement of the landing gear assembly 1 from the extended configuration to the retracted configuration is such that the pivotally mounted components move in a single plane only. The single plane is the lengthwise plane 5P. This is because the axes of the fixed joints (upper and lower aircraft joints 65, 15, third aircraft joint 75), the second movable joint 25 and hinge 55 (the first movable joint) all extend in a direction orthogonal to the lengthwise plane 5P.

Figure 4:
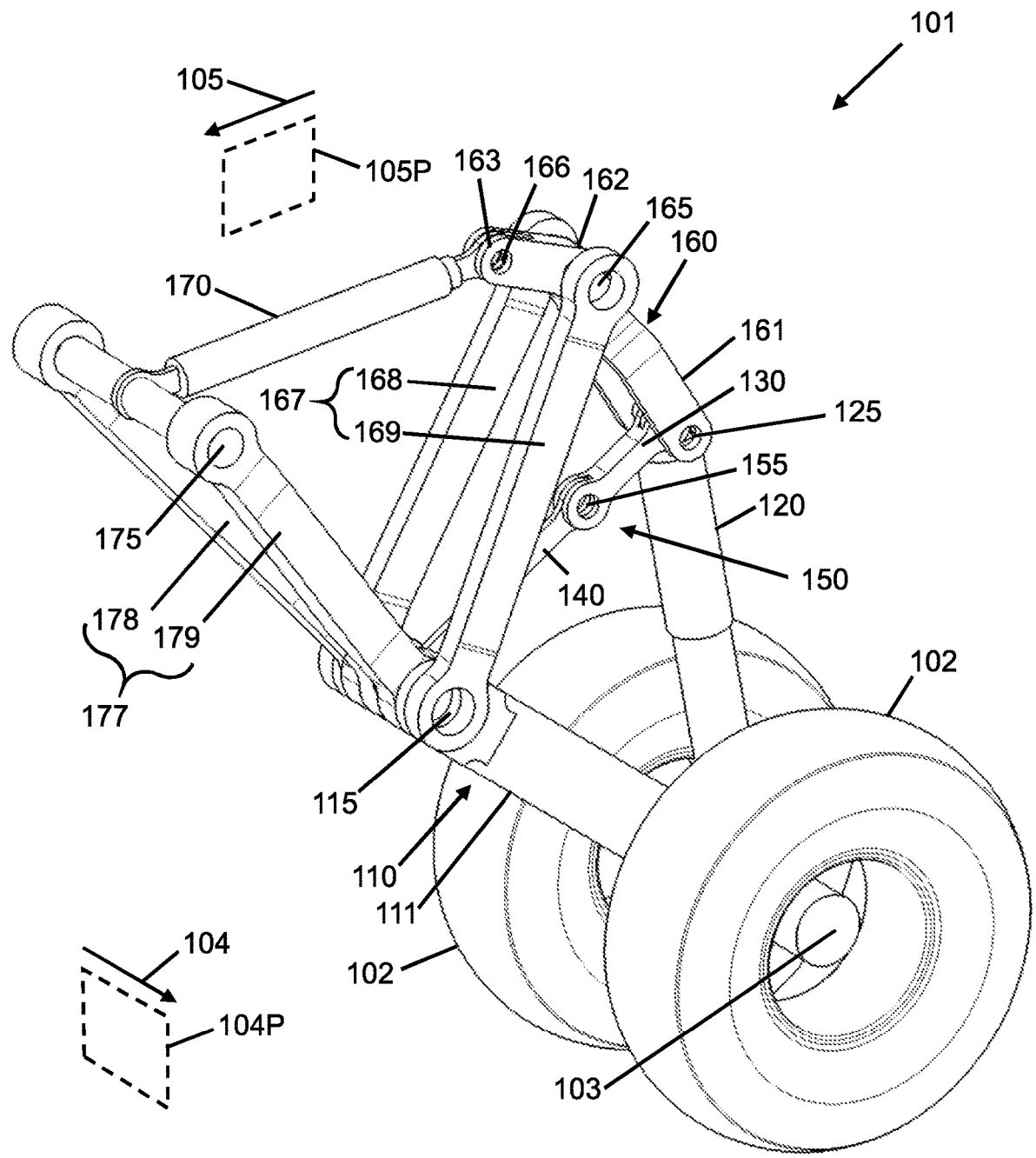
FIG. 4 shows a perspective view of a landing gear assembly according to a second embodiment of the invention, when the landing gear assembly is in an extended configuration.

FIG. 4 shows a perspective view of a landing gear assembly 101 according to a second embodiment, when the landing gear assembly 101 is in an extended configuration. As with the landing gear assembly 1 of first embodiment, the assembly 101 of the second embodiment is shown, in FIG. 4, fully extended before making contact with the ground, such that the assembly 101 is deployed ready for landing but the weight of the aircraft is not yet on the wheels. Features shown in the second embodiment are incremented by 100 from the features of the first embodiment and the differences between the first and second embodiments are discussed for brevity.

The landing gear assembly 101 comprises two wheels 102, a trailing arm 110, a shock absorber 120, an articulated lock mechanism 150, an aircraft link 160, a linear actuator 170, a first brace 167, and a second brace 177. The first brace 167, and the second brace 177 are not provided in the landing gear assembly 1 of the first embodiment. The two wheels 102 are rotatably mounted to and spaced apart from each other along an axle 103 in the spanwise direction 104. The assembly 101 can be said to comprise a trailing-arm suspension, wherein the shock absorber 120 acts against the trailing arm 110.

The lock mechanism 150 comprises an upper lock link 130 and a lower lock link 140, pivotally coupled at respective proximal ends by a hinge 155. The hinge 155 comprises a hinge member interconnecting the upper and lower lock links 130, 140. The hinge 155 enables respective distal ends of the upper and lower lock link 130, 140 to pivot towards and way from each other. The hinge 155 is a first movable joint and comprises a common axis about which the upper and lower lock links 130, 140 rotate relative to one another. The lock mechanisms 50, 150 of the first and second embodiments are structurally and operationally identical, although not all features are shown in FIG. 4 for clarity of the explanation of the other components. That is, the lock mechanism 150 is configured to fold in only one rotational direction, and unfold in only one rotational direction (the opposite direction). The lock mechanism 150 is also configured to lock when the longitudinal direction of the upper and lower lock links 130, 140 are parallel, and the switching mechanism 80 is put in the first mode (with the over-centre mechanism 90 in the first biasing configuration), as explained in relation to the first embodiment above and shown in FIG. 2a.

The landing gear assembly 101 is different from the landing gear assembly 1 of the first embodiment because the aircraft link 160 is a double-acting aircraft link 160. The double-acting aircraft link 160 comprises a first portion 161 pivotally coupled to the distal end of the upper lock link 130, a second portion 162 pivotally mountable to an aircraft at an upper aircraft joint 165, and a third portion 161 pivotally coupled to the linear actuator 170. The double-acting aircraft link 160 comprises a dogleg structure, wherein the second portion 162 comprises a bend of the dogleg.

The assembly 101 is further different in that the linear actuator 170 is pivotally coupled to the third portion 161 of the double-acting aircraft link 160, rather than the second portion 162 of the double-acting aircraft link 160. Movement of the first portion 161 of the double-acting aircraft link 160 is proportional to the movement by the linear actuator 170 of the third portion 163 of the double-acting aircraft link 160.

The pivotal coupling of the shock absorber 120, the upper lock link 130, and the double-acting aircraft link 160 together form a second movable joint 125. The pivotal coupling of the third portion 163 of the double-acting aircraft link 160 and the linear actuator 170 form a third movable joint 166. The second movable joint 125 is separate to the third movable joint 161. That is, the linear actuator 170 is arranged to indirectly move the second movable joint 125 and directly move the third movable joint 161. The aircraft link 160 is pivotally coupled to an aircraft at an upper aircraft joint 165. The second movable joint 125 and the third movable joint 161 are proportionally pivotal about the upper aircraft joint 165.

In use, the trailing arm 110, the second portion 162 of the double-acting aircraft link 160, and the linear actuator 170 are each pivotally coupled to a fuselage of the aircraft at respective joints 115, 165, 175. The trailing arm 110 is pivotally mountable to the aircraft at a lower aircraft joint 115. The double-acting aircraft link 160 is pivotally mountable to the aircraft at the upper aircraft joint 165. The linear actuator 170 is pivotally mountable to the aircraft at a third aircraft joint 175. Each aircraft joint 115, 165, 175 is pivotally fixed to the aircraft structure. In this embodiment, the aircraft structure is the landing gear bay. In other embodiments, the aircraft structure may include the landing gear bay and/or the fuselage and/or the wing.

The first brace 167 comprises a first member 168 and a second member 169. Each of the first and second members 168, 169 extend between the upper and lower aircraft joints 165, 115. The first and second members 168, 169 are spaced apart from each other in a spanwise direction 104 of the landing gear assembly 101.

The second brace 177 comprises a first member 178 and a second member 179. Each of the first and second members 178, 179 extend between the third and lower aircraft joints 175, 115. The first and second members 178, 179 are spaced apart from each other in the spanwise direction 104 of the landing gear assembly 101.

Figure 5A:
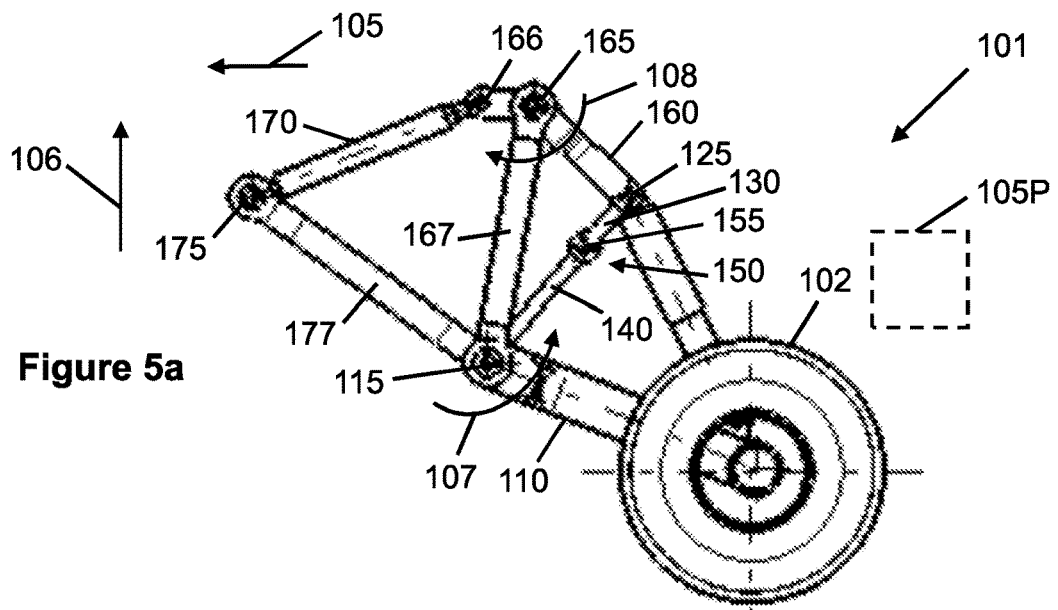
FIGS. 5a to 5f each show an outboard side view of a successive stage of retraction of the landing gear assembly according to the second embodiment.
Figure 5B:
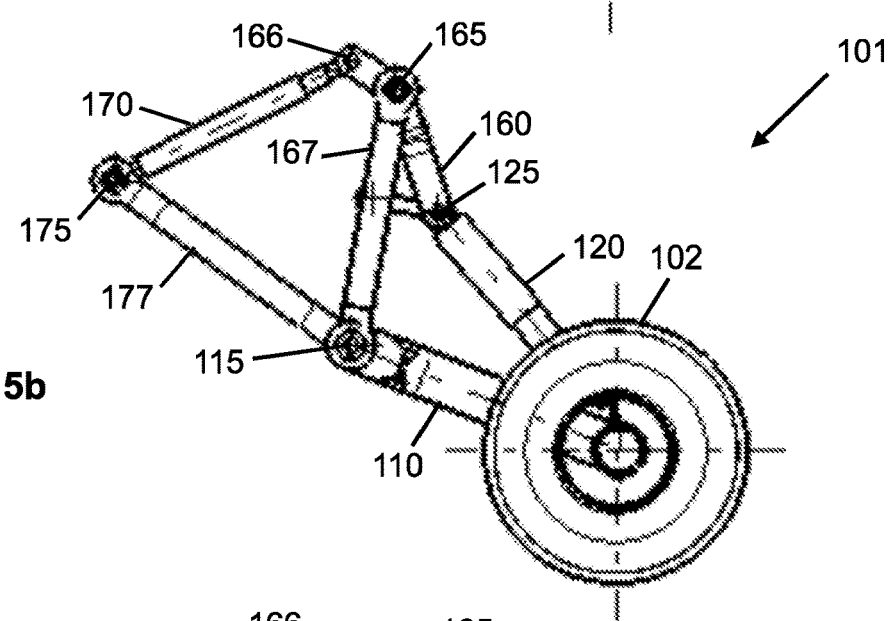
Figure 5C:
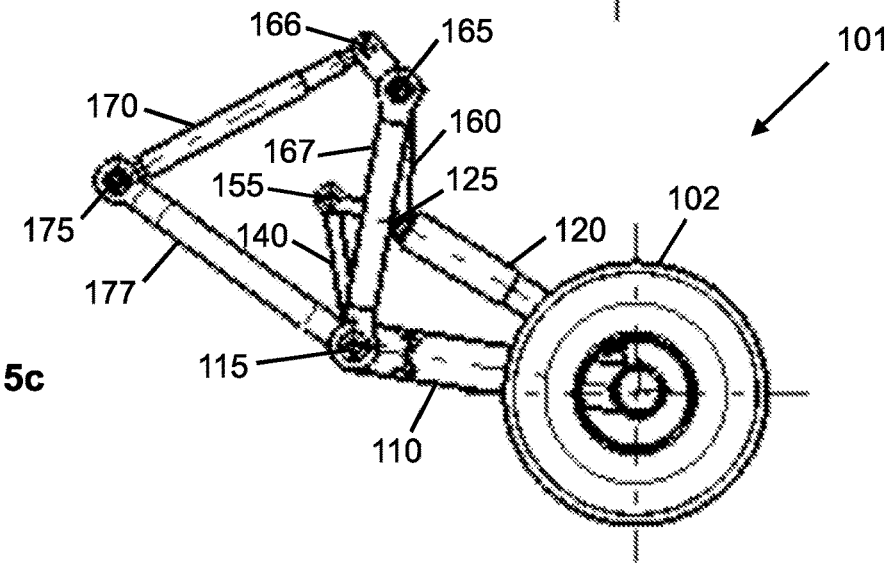
Figure 5D:
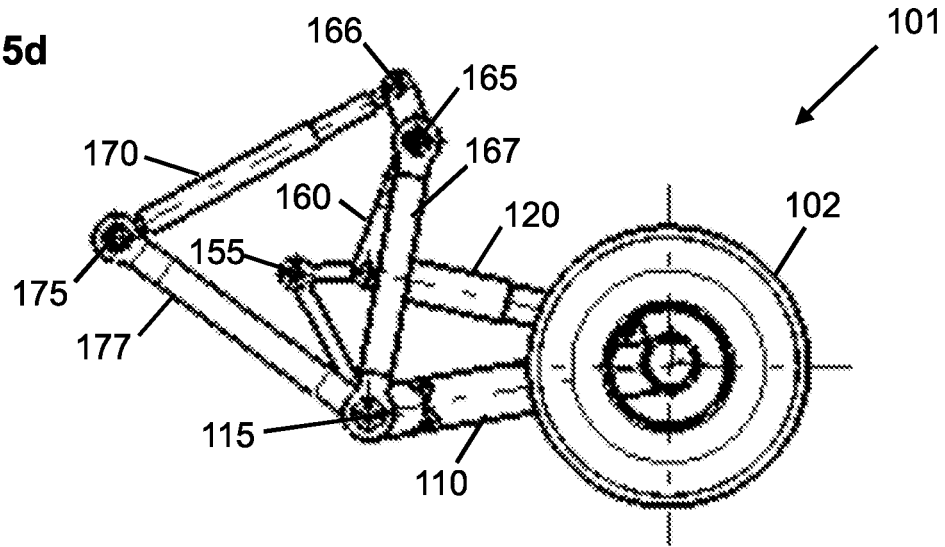
Figure 5E:
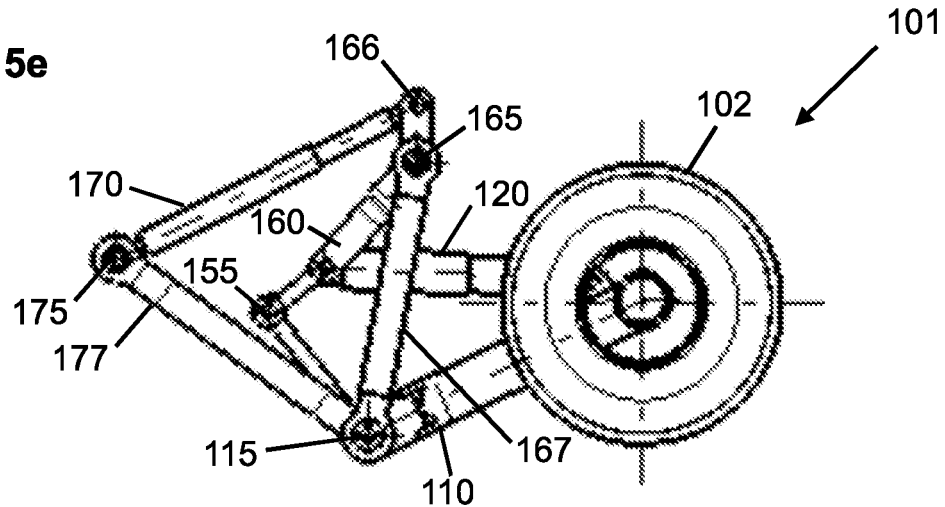
Figure 5F:
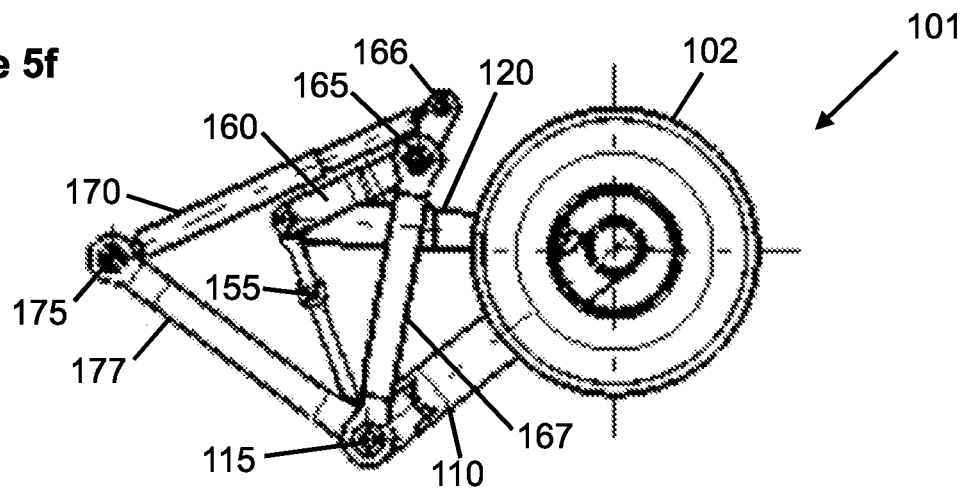

FIGS. 5a to 5f each show an outboard side view of a successive stage of retraction of the landing gear assembly 101. In FIG. 5a, the assembly 101 is in the extended configuration, corresponding to FIG. 4. In FIG. 5f, the assembly 101 is in the retracted configuration. In FIGS. 5b to 5e, the assembly 101 is in a respective intermediate configuration between the extended and retracted configurations. In the extended and retracted configurations, shown in FIGS. 5a and 5c, the lock mechanism 150 is locked in the extended and retracted locking configurations respectively, and the switching mechanism (see FIG. 2a of the first embodiment) is in the first mode. In the extended and retracted locking configurations, the relative arrangement of the various components of the lock mechanism 150 is identical. In the intermediate configurations, shown in FIGS. 5b to 5e, the switching mechanism is in the second mode.

When the assembly 101 moves between the retracted and extended configurations, the lock mechanism 150 folds and the hinge 155 moves from right-to-left and then back to the right before unfolding again when the upper and lower lock links 130, 140 re-align. As the lock mechanism 150 folds, a distance between the distal ends of the upper and lower lock links 130, 140 varies. This causes a single straight-line length of the lock mechanism 150 to decrease. As the lock mechanism 150 unfolds, the single straight-line length of the lock mechanism 150 increases, and the distance between the distal ends of the upper and lower lock links 130, 140 increases to a maximum operable distance.

The retraction and extension of the landing gear assembly 101 of the second embodiment is different to the retraction and extension of the landing gear assembly 1 of the first embodiment.

Firstly, the linear actuator 170 extends when the assembly 101 retracts. Thus, when the linear actuator 170 pushes the third movable joint 166 away from the third aircraft joint 175 to retract the assembly 101, the second movable joint 125 moves towards the third aircraft joint 175. In contrast, the linear actuator 70 of the first embodiment pulls the first joint 25 towards the third aircraft joint 75 when the assembly 1 retracts.

Secondly, the linear actuator 170 indirectly moves the first and second movable joints 155, 125 by directly acting on the third movable joint 166 when the lock mechanism 150 is unlocked. This enables the linear actuator 170 of the second embodiment to have a smaller range of extension compared to a range of extension of the linear actuator 170 of the first embodiment.

When the landing gear assembly 101 is in extended configuration and the lock mechanism 150 is locked in the extended locking configuration, the lock mechanism 150 holds the first to third movable joints 155, 125, 166 in position relative to the upper, lower and third aircraft joints 165, 115, 175. This enables landing gear loads to be transferred to the aircraft through the trailing arm 110, the shock absorber 120, the upper and lower lock links 130, 140 of the lock mechanism 150, the double-acting aircraft link 160, and the first and second braces 167, 177. Beneficially, the landing gear loads bypass the linear actuator 170 when the landing gear assembly 101 is locked in the extended configuration because the lock mechanism 150 fixes the assembly 101 in position without effort from the linear actuator 170.

By pivotally coupling the linear actuator 170 to the third movable joint 166, the end of the linear actuator 170 coupled to the third movable joint 166 is raised above the upper aircraft joint 165 when the assembly 101 is moved away from the retracted configuration, as shown in all of FIGS. 5b to 5f. The second and third movable joints 125, 166 proportionally pivot about the upper aircraft joint by an angle of over 90 degrees when the assembly 101 is moved from the extended configuration, shown in FIG. 5a, to the retracted configuration, shown in FIG. 5f.

Figure 6:
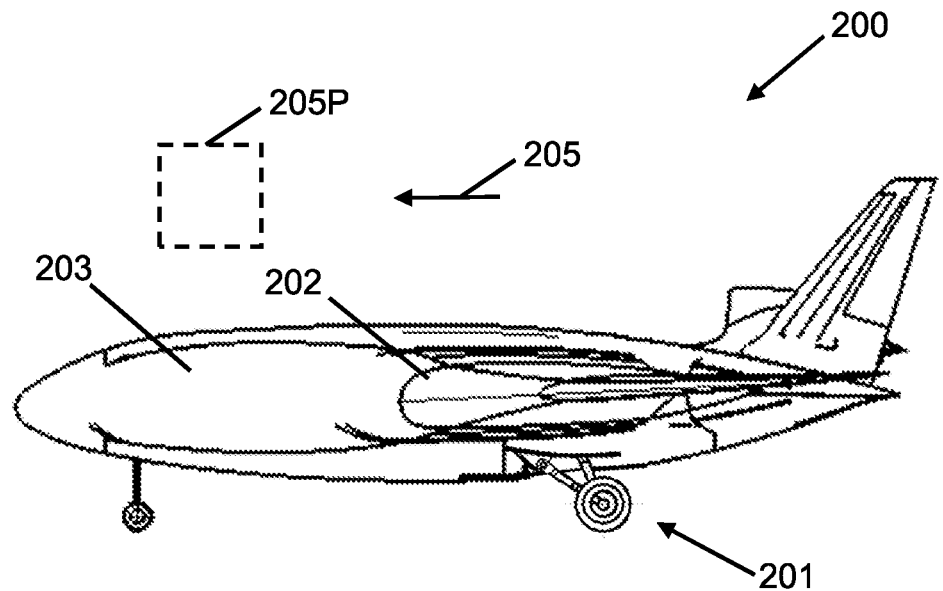
FIG. 6 shows a side view of an aircraft with a landing gear assembly extended according to a second embodiment of the invention.

FIG. 6 shows a side view of an aircraft 200 with landing gear 201 extended. The aircraft 200 comprises a fuselage 203 between two wings 202 of the aircraft 200. The fuselage 203 is indicative of the body of the aircraft 200. The aircraft 200 is a blended wing aircraft, wherein the wings 202 and body 203 blend smoothly without an abrupt join. In this embodiment, the landing gear 201 is mounted on the body 203 of the aircraft 200. Landing gear 201 is arranged on either side of a centreline of the aircraft 200. While FIG. 6 shows landing gear 201 mounted on the body 203, in other embodiments the landing gear 201 may be a nose landing gear or may be mounted on the wing 202 of the aircraft 200. Each landing gear 201 of FIG. 5 may comprise the landing gear assembly 1, 101 according to the first or second embodiment or any other alternative embodiment described herein.

The landing gear 201 is configured to extend and retract by movement along a single vertical plane 205. The single vertical plane 205 extends in a direction parallel to a lengthwise direction 205 of the aircraft 200. The landing gear 201 therefore has a freedom of movement that is constrained to one plane 205, such that movement of the landing gear 201 through the two planes orthogonal to the one plane 205 is prevented.

Figure 7:
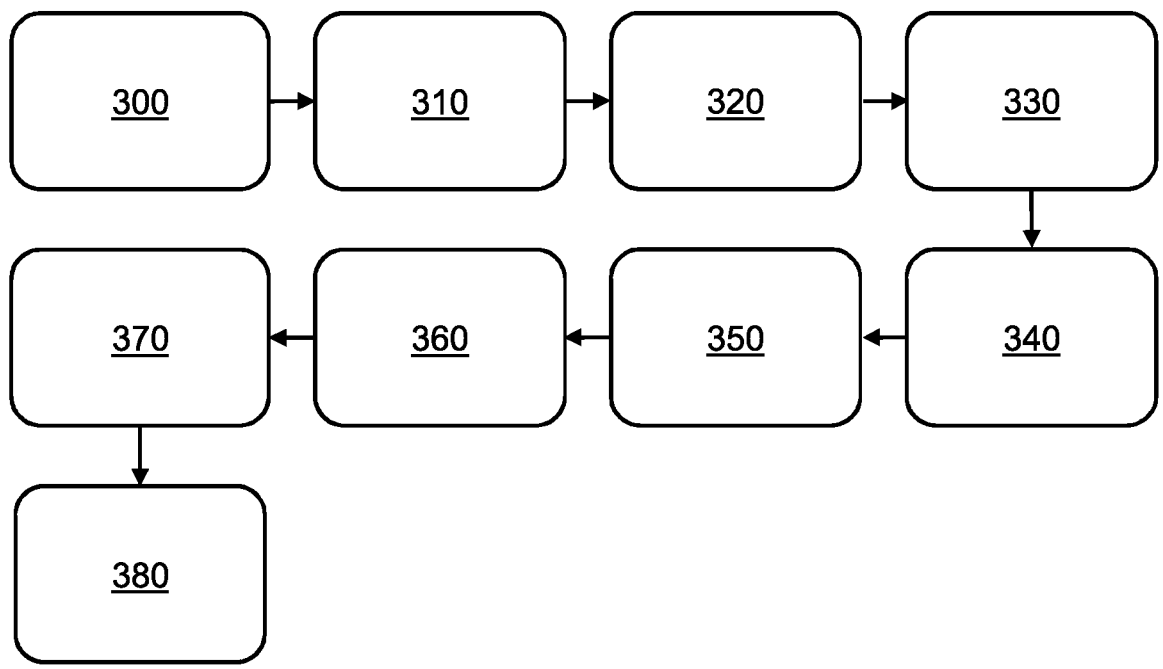
FIG. 7 shows an example method in accordance with the invention.

FIG. 7 shows a method of operating an aircraft landing gear assembly, for example using the landing gear assembly 1, 101 according to the first or second embodiment. The landing gear assembly comprises: a trailing arm carrying a wheel (for example, trailing arms 10, 110); a shock absorber pivotally coupled to the trailing arm (for example, shock absorbers 20, 120); and an articulated lock mechanism (for example, lock mechanisms 50, 150). The lock mechanism comprises an upper lock link comprising a distal end and a proximal end (for example, upper lock links 30, 130), the distal end pivotally coupled to the shock absorber. The articulated lock mechanism further comprises a lower lock link comprising a distal end and a proximal end (for example, lower lock links 40, 140), the distal end pivotally coupled to the trailing arm. The proximal ends of the upper and lower lock links are pivotally coupled to each other about a common axis (for example, the common axis of hinges 55, 155).

Extending the landing gear assembly causes the assembly to move 300 to an extended configuration. In the extended configuration, the articulated lock mechanism is locked 310 in an extended locking configuration. When locked in the extended locking configuration, the distal ends of the upper and lower lock links are displaced by a first distance. Unlocking 320 the lock mechanism (thereby releasing the landing gear from the extended configuration) and moving 330 the landing gear assembly to the retracted configuration causes the distal ends of the upper and lower lock links to vary 340 in distance. The upper and lower lock links vary in distance until their distal ends return 350 to the first distance when the landing gear assembly is moved 360 to the retracted configuration and the lock mechanism is locked 380 in a retracted locking configuration.

Optionally, the landing gear assembly comprises a switching mechanism (for example, switching mechanism 80) comprising a biasing member (for example, biasing member 95). Putting the switching mechanism in a first mode biases the lock mechanism towards the extended locking configuration. To keep the lock mechanism in the extended locking configuration, the switching mechanism is kept in the first mode. To unlock 380 the lock mechanism, the switching mechanism is switched 370 to a second mode. In the second mode, the switching mechanism cause the biasing member to bias the articulated lock mechanism away from the extended locking configuration.

Optionally, the landing gear assembly comprises an aircraft link (for example, aircraft links 60, 160). The aircraft link may comprise a first portion pivotally coupled to the distal end of the upper lock link, and a second portion pivotally mountable to an aircraft at an upper aircraft joint. The pivotal coupling of the second portion of the aircraft link, the distal end of the upper lock link, and the shock absorber together may form a movable joint (for example, second movable joints 25, 125). Optionally, the assembly further comprises an actuator (for example, linear actuators 70, 170). Optionally, the actuator is pivotally mountable to the aircraft at a third aircraft joint and pivotally coupled to the movable joint. Optionally, the assembly is further pivotally mountable to the aircraft at a lower aircraft joint (for example, aircraft joints 15, 115), the lower aircraft joint being formed by the pivotal coupling of the lower lock link and the trailing arm. Optionally, moving 300 the landing gear assembly to the retracted configuration causes the movable joint to be moved by the actuator relative to the upper aircraft joint.

Optionally, the lock mechanism is locked 310 in an extended locking configuration by holding the movable joint in position relative to the upper and lower aircraft joints. Holding the movable joint enables landing gear loads to be transferred to the aircraft through the trailing arm, the shock absorber, the upper and lower lock links of the articulated lock mechanism, and the aircraft link without passing through the actuator.

Optionally, the landing gear assembly comprises a double-acting aircraft link (for example, double-acting aircraft link 160). The lock mechanism and the double-acting aircraft link may be pivotally coupled at a first movable joint (for example, second movable joint 125). The actuator and the double-acting aircraft link may be pivotally coupled at a second movable joint (for example, third movable joint 166). Optionally, moving 300 the landing gear assembly to the retracted configuration causes the first movable joint to be indirectly moved by the actuator relative to the upper aircraft joint.

Whilst the present invention has been described and illustrated with reference to particular embodiments, it will be appreciated by those of ordinary skill in the art that the invention lends itself to many different variations not specifically illustrated herein. By way of example only, certain possible variations will now be described. For example, at least one of the joints 15, 65, 75 may be pivotally coupled mounted to a wing of the aircraft. The first and second brace 167, 177 of the landing gear assembly 101 may be omitted. The trailing arm 10, 110 may carry a single wheel. Lengthwise directions of the upper and lower lock links 30, 40, 130, 140 may not be parallel to each other when the lock mechanism 50, 150 is locked in the retracted locking configuration and, separately, in the extended locking configuration. The linear actuator 70 of the first embodiment may be retracted in the extended configuration of the assembly 1. The linear actuator 170 of the second embodiment may be extended in the extended configuration of the assembly 101.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A landing gear assembly comprising:
 a trailing arm for carrying a wheel;
 a shock absorber pivotally coupled to the trailing arm for damping movement of the trailing arm; and
 an articulated lock mechanism comprising:
  an upper lock link comprising a distal end and a proximal end, the distal end pivotally coupled to the shock absorber; and
  a lower lock link comprising a distal end and a proximal end, the distal end pivotally coupled to the trailing arm;
  wherein the proximal ends of the upper and lower lock links are pivotally coupled to each other about a common axis, such that relatively pivoting the upper and lower lock links about the common axis causes a distance between the distal ends to vary, and the articulated lock mechanism is lockable to inhibit relative pivoting of the upper and lower lock links about the common axis and thereby lock the landing gear assembly in an extended configuration and, separately in a retracted configuration;
 wherein, when the landing gear assembly is in the extended configuration, the articulated lock mechanism is locked in an extended locking configuration, when the landing gear assembly is in the retracted configuration, the articulated lock mechanism is locked in a retracted locking configuration, and in the extended and retracted locking configurations, the distance between the distal ends of the upper and lower lock links is substantially the same.

2. The landing gear assembly according to claim 1, wherein the distance between the distal ends of the upper and lower lock links in the extended and retracted locking configurations is substantially equal to a maximum operable distance between the distal ends of the upper and lower lock links.

3. The landing gear assembly according to claim 1, wherein, when the articulated lock mechanism is arranged in each of the extended and retracted locking configurations, the common axis of the articulated lock mechanism lies on a first plane that extends between the distal ends of the upper and lower lock links and is substantially parallel to the common axis.

4. The landing gear assembly according to claim 1, wherein, when the articulated lock mechanism is arranged in each of the extended and retracted locking configurations, the common axis is part way between the distal ends of the upper and lower lock links.

5. The landing gear assembly according to claim 1, comprising a biasing member to bias the articulated lock mechanism towards the extended and retracted locking configurations.

6. The landing gear assembly according to claim 5, wherein the articulated lock mechanism comprises a switching mechanism switchable between a first mode and a second mode, wherein, when the switching mechanism is in the first mode, the biasing member biases the articulated lock mechanism towards the extended or retracted locking configurations, and wherein, when the switching mechanism is in the second mode, the biasing member biases the articulated lock mechanism away from the extended or retracted locking configurations.

7. The landing gear assembly according to claim 1, comprising:
   an aircraft link comprising a first portion pivotally coupled to the distal end of the upper lock link, and a second portion pivotally mountable to an aircraft at an upper aircraft joint, wherein the pivotal coupling of the second portion of the aircraft link, the distal end of the upper lock link, and the shock absorber together form a movable joint;
   wherein a second plane extends between the upper aircraft joint and the distal end of the lower lock link and is substantially parallel to the common axis of the articulated lock mechanism, such that, when the articulated lock mechanism is in the extended locking configuration, the movable joint is located on one side of the second plane, and when the articulated lock mechanism is in the retracted locking configuration, the movable joint is located on the other side of the second plane.

8. The landing gear assembly according to claim 7, the landing gear assembly being further pivotally mountable to the aircraft at a lower aircraft joint, the lower aircraft joint being formed by the pivotal coupling of the lower lock link and the trailing arm.

9. The landing gear assembly according to claim 7, comprising:
   an actuator pivotally mountable to the aircraft at a third aircraft joint and pivotally coupled to the movable joint;
   wherein the actuator is arranged to directly move the movable joint through the second plane by extending and retracting with respect to the third aircraft joint.

10. The landing gear assembly according to claim 7, wherein the aircraft link is a double-acting aircraft link, the landing gear assembly comprising:
    an actuator pivotally mountable to the aircraft at a third aircraft joint and pivotally coupled to a third portion of the double-acting aircraft link;
    wherein the actuator is arranged to pivot the double-acting aircraft link about the upper aircraft joint and cause the movable joint to indirectly move through the second plane by extending and retracting with respect to the third aircraft joint.

11. The landing gear assembly according to claim 1, wherein the trailing arm, the shock absorber, and the articulated lock mechanism relatively pivot substantially parallel to a common plane from the extended configuration to the retracted configuration of the landing gear assembly.

12. The landing gear assembly according to claim 1, wherein the articulated lock mechanism is in tension when the landing gear assembly is arranged in the extended configuration and the articulated lock mechanism is arranged in the extended locking configuration, and wherein the articulated lock mechanism is in tension when the landing gear assembly is arranged in the retracted configuration and the articulated lock mechanism is arranged in the retracted locking configuration.

13. An aircraft comprising the landing gear assembly according to claim 1.

14. A method of operating a landing gear assembly, the landing gear assembly comprising:
    a trailing arm carrying a wheel;
    a shock absorber pivotally coupled to the trailing arm; and
    an articulated lock mechanism comprising:
       an upper lock link comprising a distal end and a proximal end, the distal end pivotally coupled to the shock absorber; and
       a lower lock link comprising a distal end and a proximal end, the distal end pivotally coupled to the trailing arm;
       wherein the proximal ends of the upper and lower lock links are pivotally coupled to each other about a common axis;
    wherein, in an extended configuration of the landing gear assembly, the articulated lock mechanism is locked in an extended locking configuration to thereby lock the landing gear assembly in the extended configuration and the distal ends of the upper and lower lock links are displaced by a first distance,
    wherein unlocking the articulated lock mechanism thereby releasing the landing gear from the extended configuration, and moving the landing gear assembly to a retracted configuration causes a distance between the distal ends of the upper and lower lock links to vary, until the distal ends of the upper and lower lock links return to substantially the first distance when the landing gear assembly is in the retracted configuration and the articulated lock mechanism is locked in a retracted locking configuration to thereby lock the landing gear assembly in the retracted configuration.

15. The method of operating the landing gear assembly according to claim 14, wherein the landing gear assembly comprises:
    a switching mechanism comprising a biasing member;
    wherein, in the extended locking configuration, the switching mechanism is in a first mode in which the biasing member biases the articulated lock mechanism towards the extended locking configuration, and the unlocking the articulated lock mechanism comprises switching the switching mechanism to a second mode to cause the biasing member to bias the articulated lock mechanism away from the extended locking configuration.

16. The method of operating the landing gear assembly according to claim 14, wherein the landing gear assembly comprises:
    an aircraft link comprising a first portion pivotally coupled to the distal end of the upper lock link, and a second portion pivotally mountable to an aircraft at an upper aircraft joint, wherein the pivotal coupling of the second portion of the aircraft link, the distal end of the upper lock link, and the shock absorber together form a movable joint; and
    an actuator pivotally mountable to the aircraft at a third aircraft joint and pivotally coupled to the aircraft link;
    the landing gear assembly being further pivotally mountable to the aircraft at a lower aircraft joint, the lower aircraft joint being formed by the pivotal coupling of the lower lock link and the trailing arm;

wherein, the moving the landing gear assembly to the retracted configuration causes the movable joint to be moved by the actuator relative to the upper aircraft joint, and the articulated lock mechanism is locked in the extended locking configuration by holding the movable joint in position relative to the upper and lower aircraft joints to enable landing gear loads to be transferred to the aircraft through the trailing arm, the shock absorber, the upper and lower lock links of the articulated lock mechanism, and the aircraft link and to bypass the actuator.

17. A landing gear assembly comprising:

a trailing arm comprising a first end pivotally mountable to an aircraft about a trailing arm axis, and a second end carrying a rotatable wheel;

a shock absorber pivotally coupled to the trailing arm for damping rotation of the trailing arm about the trailing arm axis;

a link comprising a first end pivotally mountable to an aircraft, and a second end pivotally coupled to the shock absorber about a movable axis;

an articulated lock mechanism comprising two links hinged about a joint and operable in a locking configuration to inhibit rotation of the two links about the joint, one of the links being pivotally coupled to the trailing arm about the trailing arm axis and another one of the links being pivotally coupled to the shock absorber about the movable axis;

wherein, when the landing gear assembly is arranged in each of an extended configuration and a retracted configuration, the articulated lock mechanism is arranged in a substantially identical locking configuration to thereby lock the landing gear assembly in the extended configuration and, separately in the retracted configuration, respectively.

* * * * *